(12) United States Patent
Anderson et al.

(10) Patent No.: US 10,523,893 B2
(45) Date of Patent: Dec. 31, 2019

(54) METHOD AND APPARATUS FOR PRESENTING AUDIO AND VISUAL INFORMATION

(71) Applicants: Matthew Anderson, La Mesa, CA (US); Eric Johnson, La Mesa, CA (US)

(72) Inventors: Matthew Anderson, La Mesa, CA (US); Eric Johnson, La Mesa, CA (US)

( * ) Notice: Subject to any disclaimer, the term of this patent is extended or adjusted under 35 U.S.C. 154(b) by 0 days.

(21) Appl. No.: 15/984,097

(22) Filed: May 18, 2018

(65) Prior Publication Data

US 2019/0356878 A1    Nov. 21, 2019

(51) Int. Cl.
| | |
|---|---|
| *H04N 9/74* | (2006.01) |
| *H04N 5/72* | (2006.01) |
| *H04N 5/445* | (2011.01) |
| *G09B 5/02* | (2006.01) |
| *G06T 3/60* | (2006.01) |
| *G02B 5/22* | (2006.01) |

(52) U.S. Cl.
CPC ............ *H04N 5/72* (2013.01); *G06T 3/60* (2013.01); *G09B 5/02* (2013.01); *H04N 5/44504* (2013.01); *G02B 5/22* (2013.01)

(58) Field of Classification Search
CPC ...... H04N 5/72; H04N 5/44504; H04N 5/225; H04N 5/262; H04N 9/74; G06T 3/60; G09B 5/02; G02B 5/22
USPC ........... 348/14.01, 14.03, 580, 207.1, 207.11
See application file for complete search history.

(56) References Cited

U.S. PATENT DOCUMENTS

| | | | | |
|---|---|---|---|---|
| 6,802,611 B2* | 10/2004 | Chu | ............... | H04N 1/19594 353/28 |
| 7,468,778 B2* | 12/2008 | Thomas | ............... | G03B 15/06 348/E5.022 |
| 7,710,391 B2* | 5/2010 | Bell | ............... | G06F 3/011 345/156 |
| 8,570,357 B2* | 10/2013 | Tan | ............... | H04N 7/15 348/14.08 |
| 9,049,482 B2* | 6/2015 | Reichelt | ............... | G06T 11/00 |

* cited by examiner

*Primary Examiner* — Trang U Tran

(57) ABSTRACT

Method and apparatus for presenting audio and visual information to an audience by streaming, broadcast, live and recording presentations including a generally planar display screen, a light source directing light towards the display screen, a video camera oriented towards the display screen so as to image a lecturer through the display screen and a filter disposed between the display screen and the video camera. In one embodiment the light source emits light in predominately blue wavelengths and the filter blocks at least 85% of light at approximately the same wavelengths. Visual information may then be beneficially written by a lecturer on the display screen using a fluorescent marker pen. In operation an image output of the video camera is reversed in left-to-right orientation so that visual image information written by a lecturer onto the display screen is reversed from an orientation of this information viewed through the display screen.

13 Claims, 4 Drawing Sheets

METHOD AND APPARATUS FOR PRESENTING AUDIO AND VISUAL INFORMATION

BACKGROUND OF THE INVENTION

The present invention pertains to methods and apparatus for presenting a combination of audio and visual information by a lecturer and generally intended to be recorded, displayed, transmitted or otherwise broadcast.

Traditionally presenting information in various settings, such as education, have required some method and apparatus for presenting both audio and visual information by a lecturer. Lecturers in higher education of the sciences are an example of one such application. One of the oldest apparatus to accomplish this task is the blackboard, believed to have first been introduced by James Pillans, headmaster and geography teacher at the Old High School in Edinburg, Scotland in about 1801. Headmaster Pillans' innovative use of slate sheets upon which he could present visual information by writing upon the slate with chalk was rapidly adopted by many educational institutions. In less than a decade, by 1809, it is believed most public schools in major metropolitan areas generally included blackboards although the term "blackboard" itself is not considered to have been generally adopted until about 1815.

The next advancement in presenting both audio and visual information by a lecturer is believed to have occurred in the early 1960's when the one or more sheets of slate forming the conventional blackboard were replaced by what came to be called a "greenboard" comprising a steel plate coated with a porcelain-based enamel. This was considered an improvement because chalk powder could be more easily removed from the greenboard compared to a sheet of slate and because the green color was considered more pleasing and easier on the eyes than the stark black or dark grey of conventional blackboards. The greenboard was also regarded as more durable than the relatively fragile sheets of slate used in connection with conventional blackboards and lighter in weight, thereby reducing shipping costs.

The use of chalk was eventually eliminated in some settings with the introduction in the 1980's of the so-called "whiteboard" comprising dry erase board used in combination with ink markers. By the mid 1990's many colleges and universities in the United States and elsewhere had switched entirely over to the use of whiteboards.

All of these various blackboards, greenboards and whiteboards, however, suffer from one unavoidable and highly noticeable disadvantage; the lecturer has to turn their back on their audience in order to write visual information upon the board. It is estimated their audience sees only the posterior of the lecturer for up to half the time the lecturer is making their presentation. The present invention solves this two hundred-year-old problem.

BRIEF SUMMARY OF THE INVENTION

The present invention overcomes the deficiencies mentioned above and further allows a lecturer to enliven their presentation by providing methods and apparatus for presenting both audio and visual information to an audience without having the lecturer turn away from the audience in order to write down visual information.

To attain these goals one embodiment of the apparatus of the present invention comprises a visual presentation system comprising a generally planar and transparent display screen, a light source directing light towards the display screen, a video camera oriented to image the display screen and a filter disposed between the display screen and the video camera. In one embodiment the light source projects predominately blue light and the filter blocks predominantly that same blue light. In an alternative embodiment of the invention the light source radiates predominantly at about 405 nanometers. In yet another embodiment of the present invention the filter predominantly blocks light in the range of wavelengths of 410 nanometers to 460 nanometers. In a still further embodiment of the present invention the filter blocks at least 85% of the light in the range of 410 nanometers to 460 nanometers. In still another embodiment of the present invention a mirror is provided and the video camera is oriented to image the display screen via a reflection of the display screen from the mirror. In an alternative embodiment of the present invention hardware or software is used to reverse the image captured by the video camera.

According to one method of the present invention the lecturer is imaged by the video camera through the display screen and the lecturer presents the visual portion of their presentation by writing with a marker on the surface of the display screen, the left-right orientation of the video image then being reversed, thereby presenting the visual portion of the presentation in the correct orientation for viewing and reading in the image. In further embodiments of the present invention the light source projects generally blue light, the lecturer writes with a fluorescent marker and in still additional embodiments of the present invention the filter is configured to filter out the generally blue light.

In an alternative embodiment of the present invention a method of presenting audio and visual information is disclosed including the steps of presenting a recording of audio and visual information, said information comprising a lecturer imaged through a display screen while presenting information both verbally and visually by writing on the display screen with a light source illuminating the display screen and while filtering some of the illumination from the light source and reversing the left-right orientation of the image. In additional embodiments of the present invention the light source projects generally blue light and in still further embodiments of the present invention the filter filters out generally blue light.

The foregoing, and further advantages, features and principles of the present invention will become more readily apparent from the following detailed description of several preferred embodiments of the present invention that follows below with reference to the accompanying drawings.

DETAILED DESCRIPTION

Figure 1:
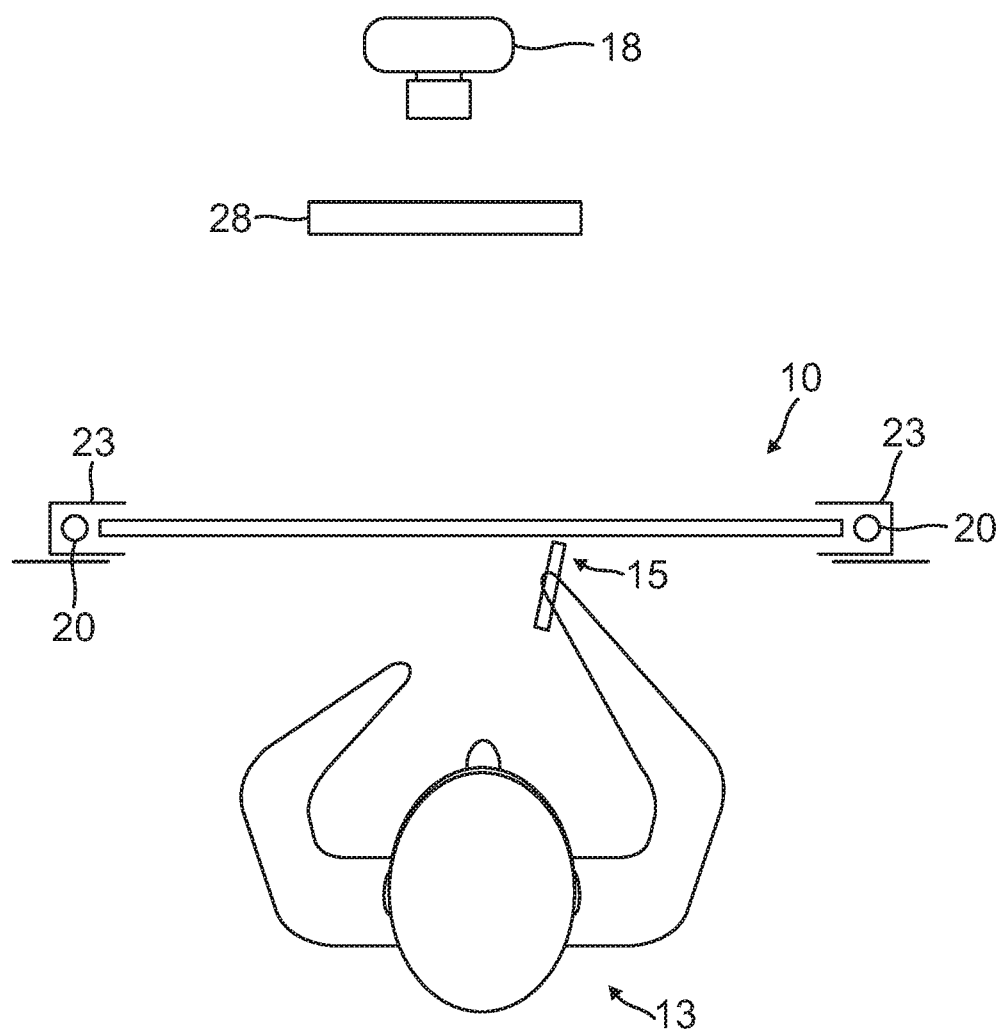
FIG. 1 is a top down view of one embodiment of the present invention.

Referring to the figures, and more specifically FIG. 1 thereof, there is shown one embodiment of the present invention. As shown in FIG. 1 there is a display screen 10 upon which a lecturer 13 presents visual information by writing thereon with a marker pen 15 with the image of the lecturer 10 and the visual information written by the lecturer 13 upon the display screen 10 being recorded and additionally, or alternatively, streamed or otherwise broadcast by a video camera 18 oriented to image the lecturer 13 through the display screen 10. One preferred embodiment the present invention further includes a light source 20 illuminating an edge of the display screen 10 and a frame 23 encasing the light source 20 while retaining the position of the light source 20 adjacent an edge of the display screen 10.

Figure 2:
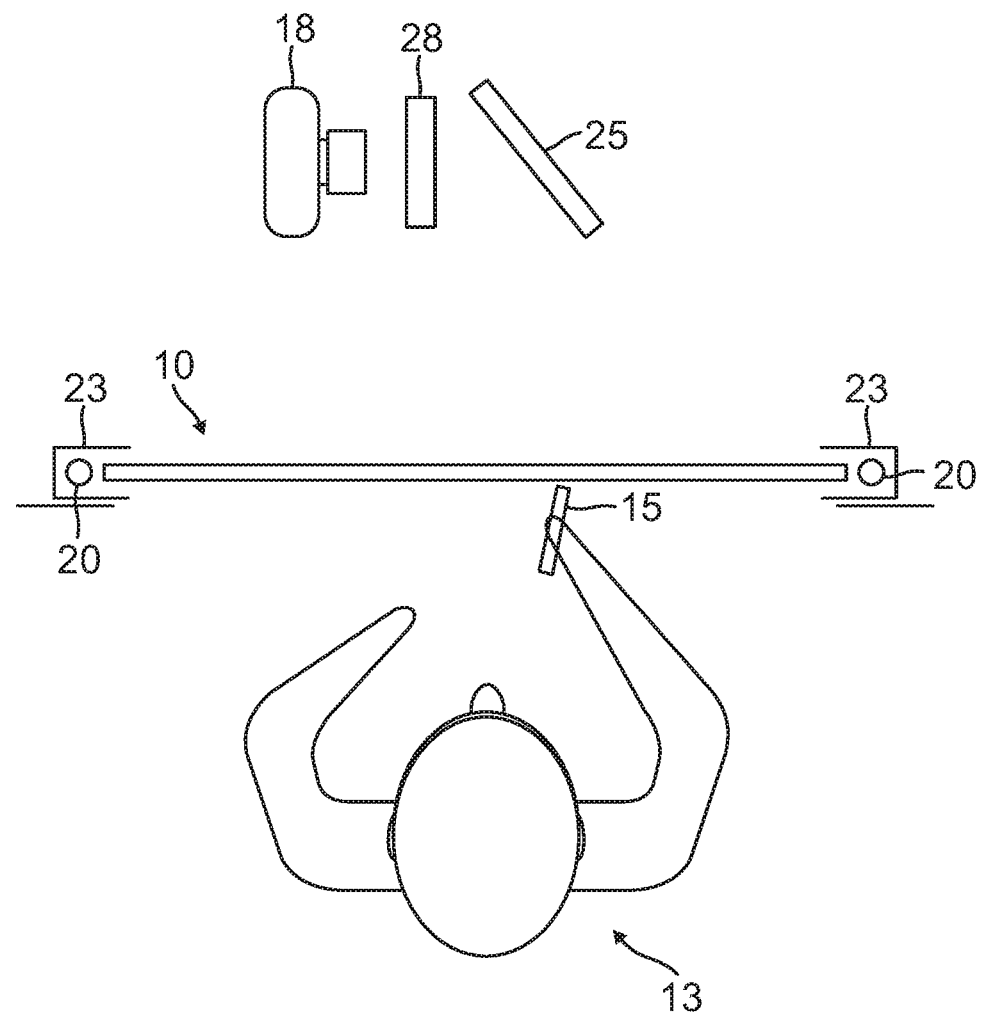
FIG. 2 is a top down view of an alternative embodiment of the present invention.
Figure 3:
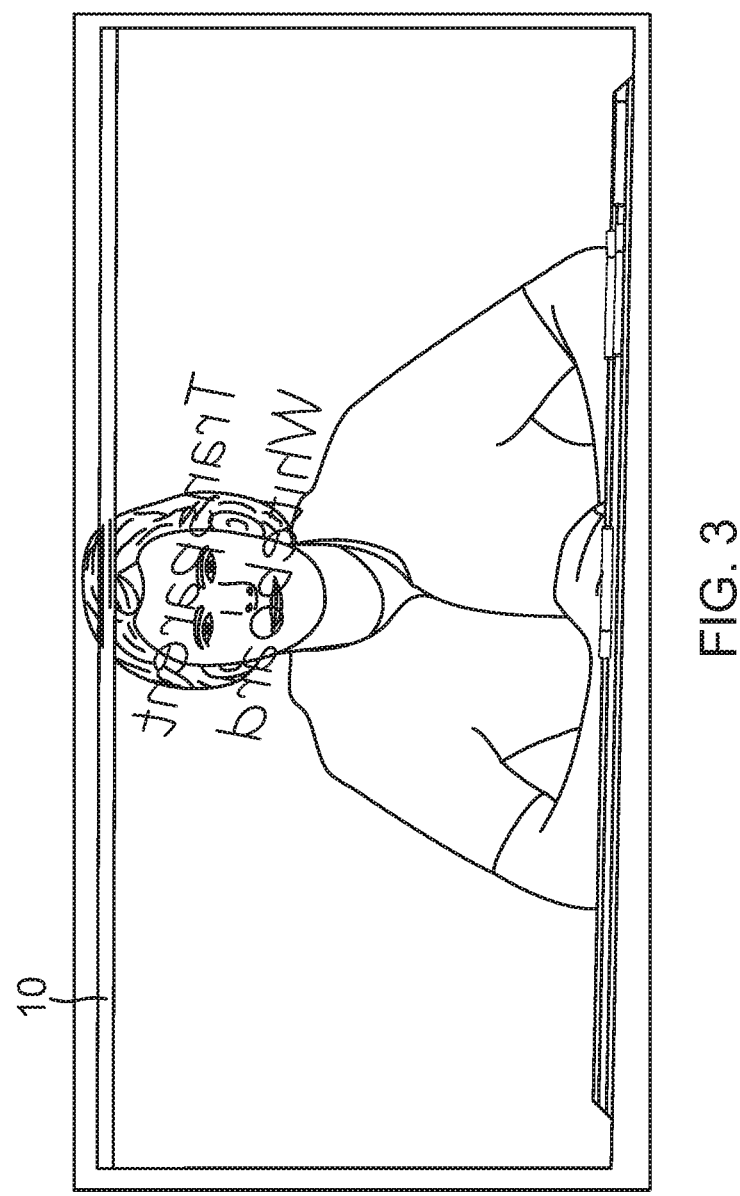
FIG. 3 is a view of written information on the display screen of the present invention as viewed by a video camera.
Figure 4:
FIG. 4 is an image of a video output of the present invention.

In operation, as shown in FIG. 3, the visual information (e.g. writing, equations, graphs and the like) written by the lecturer 13 upon the display screen 10 is imaged by the video camera 18 in reverse since the video camera 18 is oriented so as to image the lecturer 13 through the display screen 10. In accordance with one aspect of the present invention, however, as shown in FIG. 4 this image is reversed in left-to-right orientation to thereby properly orient the visual information in an output imaging of the video camera 18. As discussed further below, this reversal of the left-to-right orientation of the visual information may be achieved using software or hardware. Alternatively, as shown in FIG. 2 a reversal of the left-to-right orientation of visual information written on the display screen 10 can be achieved by orienting a mirror 25 partially towards the display screen 10 and orienting the video camera 18 so as to image a reflection of the display screen 10 and visual information written thereon off of the mirror 25.

One aspect of the current invention concerns the wavelength of the output of the light source 20. The inventors have discovered use of broad spectrum light highlights defects in or on the glass, smudges, streaks and partial erasures on the display screen 10 thereby presenting an unfavorable image of the lecturer through the display screen 10. These defects, smudges, streaks and the like have been found by the inventors to detract from the pedagogic value of the presentation. In some instances, these defects, smudges, streaks and the like have been found by the inventors to distract the audience from fully understanding or absorbing the information being presented or distract the lecturer from properly presenting their material to the audience or both. The inventors have further determined an optimal image of the lecturer 13 through the display screen 10 is achieved if the light source 20 is limited to light emissions in generally the blue portion of the spectrum. In one preferred embodiment of the present invention the light output of the light source 20 is limited to specifically around approximately 405 nanometers. In general light sources such as Light Emitting Diodes ("LED's") emitting light at around approximately 405 nanometers will output light in a band of wavelengths centered around 405 nanometers. The inventors have further found use of a light source 20 emitting light at around approximately 405 nanometers beneficially highlights visual information written on the display screen 10 with a fluorescent ink type of marker pen 15. The visual markings made on the display by the lecturer 13 using a fluorescent marker have been found by the inventors to be particularly vivid, and to aid in an audience's grasp of and attention to visual when illuminated by a light source 20 having an output at approximately 405 nanometers. One such type of fluorescent ink marker pen 15 found to present beneficially highlighted visual information written on the display screen 10 is the Expo Neon brand of dry erase marker. The inventors have also discovered, however, that using a predominately blue light source 20 will also create a saturation of blue colors in the output imaging of the video camera 18. This saturation of blue colors has further been found by the inventors to detract from the presentation of a lecturer 13. The inventors have discovered that positioning a filter 28 between the display screen 10 and the video camera 18 can minimize or eliminate this saturation of blue colors in the output imaging of the video camera 18. In one preferred embodiment of the present invention the filter reduces light output in the range of about 410 to 460 nanometers by at least 85% and in a preferred embodiment of the present invention the filter reduces light output in this range by at least 90%. In one preferred embodiment of the present invention the light source 20 is a gallium-nitride type light emitting diode disposed on opposing edges and the top and bottom of the display screen 10.

The light source 20 used for illuminating the display screen 10 is not limited to LEDs. Any light source generating light in the desired wavelength bands may be used including, but not limited to, fluorescent lights, incandescent lights, electroluminescent lights and solid-state lasers. As shown in FIGS. 1 and 2 the light source 20 is preferably disposed adjacent an edge of the display screen 10 to inject light into the structure of the display screen 10 which then acts as a waveguide for this light. Visual information written on the display screen 10 then acts as a waveguide coupler to direct light out of the display screen 10 to be imaged by the video camera 18.

As further shown in FIGS. 1 and 2 the light source 20 is disposed in one embodiment of the present invention on both sides of the display screen 10 and, as mentioned above, may further be disposed at the upper and lower edges of the display screen 10. In alternative embodiments of the present invention, however, the light sources 20 may be disposed upon only one or two edges of the display screen 10. Additionally, the frame enclosing the light sources 20 and retaining those light sources 20 adjacent the display screen 10 may be eliminated and the light sources 20 simply affixed to the edges of the display screen 10 by some suitable means such as, for example, by adhesive. In still further alternative embodiments of the present invention the light source 20 may be disposed elsewhere, other than at an edge or edges of the display screen 10, and oriented so that light from the light source 20 illuminates a surface of the display screen 10.

The video camera 18 used in the present invention may be of any of a number of commercially available off the shelf cameras suitable for recording, transmitting or streaming video images. In one preferred embodiment of the present invention a HD Camcorder type video camera is currently employed. Similarly, the means and methods of reversing the left-to-right orientation of visual information written on the display screen 10 can be achieved by any of a variety of methods and means including hardware, software or use of a mirror 25 as shown in FIG. 2. Examples of hardware solutions to reverse left-to-right orientation include the Model 420C and Model 420CS Electronic Video Mirrors sold by Colorado Video. Examples of software implementation to reverse left-to-right orientation include Filmora Video Editor software available from Wondershare Filmora and Video Flip & Rotate software available from DVDVideoSoft/Digital Wave Ltd. In one preferred embodiment of the present invention the inventors utilize a digital video scaler to achieve reversal of the left-to-right orientation of the visual information written on the display screen 10.

The present invention provides a dramatic presentation of audio and visual information to either individuals or group audiences through broadcast, streaming, recorded or live presentations while eliminating the problem of a lecturer having their back to their audience while writing down the visual portion of their presentation. The inclusion of selected wavelength bands for illuminating written information on the display 10 and inclusion of a filter in approximately the same wavelength band, have been found by the inventors to present beneficially and visually stunning images of written information and solve further problems uncovered by the inventors pertaining to defects, smudges and partial erasures on the display 10 detracting from the lecturer's presentation. Having described and illustrated the present invention in various preferred embodiments, it should be readily apparent to those skilled in the relevant arts that the present invention can be modified in arrangement and detail to provide numerous other embodiments that do not depart from the spirit and scope of this invention. Accordingly, all equivalent relationships to those illustrated in the drawings and described in the specification above are intended to be encompassed within the scope of the present invention, as set forth in the claims below and equivalents thereof.

It is to be further understood that the phraseology and terminology employed herein are for the purposes of description only and should not be regarded as limiting the scope of the present invention. Therefore, the foregoing description of the present invention is to be considered as illustrative only of the principles of the present invention. Further, since numerous modifications, changes and alternative embodiments will occur to those skilled in the art, the present invention is not to be limited to the structures, elements, construction and operation shown and described above, but solely by the claims set forth below and equivalents thereof.

What is claimed is:

1. A system for recording or presenting audio-visual information presented by a lecturer, comprising
    a generally planar and generally transparent screen;
    a light source injecting predominantly blue light into an edge of the screen,
    a visible wavelength video camera oriented to image the screen and image the lecturer and visual indicia or writing made by the lecturer on the screen through the screen, wherein the lecturer appears to be facing the camera and positioned behind the audio-visual information written by the lecturer on the screen; and
    a light filter disposed between the screen and the video camera filtering predominantly blue light from the light source.

2. The visual presentation system of claim 1 wherein the light source emits light of a wavelength predominantly around 405 nanometers.

3. The visual presentation system of claim 2 wherein the filter blocks at least some light in a range of approximately 410 nanometers to 460 nanometers.

4. The visual presentation system of claim 3 wherein the filter blocks at least about 85% of light in the range of approximately 410 nanometers to 460 nanometers.

5. The visual presentation system of claim 1 further comprising a mirror oriented partially towards the display screen and wherein the video camera is oriented to image the screen and image the lecturer through the screen via a reflection from the mirror, wherein writing made by the lecturer upon the screen is reversed in left-right orientation to appear reversed and readable in an image output of the video camera.

6. The system of claim 1 further comprising an electronic circuit configured to reverse a left-right orientation of the lecturer and visual indicia made by the lecturer on the screen.

7. The system of claim 1 further comprising a general-purpose computer programmed to reverse a left-right orientation of the lecturer and visual indicia made by the lecturer on the screen.

8. A method of recording or presenting audio-visual information presented by a lecturer, comprising the steps of:
    providing a display screen, a light source injecting predominantly blue light into an edge of the screen, and a visible wavelength video camera imaging the screen and imaging the lecturer through the screen;
    filtering predominantly blue light from the imaging of the screen;
    recording the lecturer making a presentation both verbally and by writing on the screen; and
    reversing a left-right-orientation of the screen and the lecturer imaging, wherein writing made by the lecturer on the screen is oriented in a reverse image and readable in the screen imaging.

9. The visual presentation system of claim 8 wherein the light source emits light of a wavelength predominantly around 405 nanometers.

10. The visual presentation system of claim 9 wherein the filter blocks at least some light in a range of approximately 410 nanometers to 460 nanometers.

11. The visual presentation system of claim 10 wherein the filter blocks at least about 85% of light in the range of approximately 410 nanometers to 460 nanometers.

12. The system of claim 8 further comprising positioning a mirror oriented towards the screen and orienting the video camera to image the screen and the lecturer disposed behind the screen relative to the video camera via a reflection from the mirror, wherein writing made by the lecturer upon the screen is reversed in left-right orientation to appear reversed and readable in an image output of the video camera.

13. A method of recording or presenting audio-visual information presented by a lecturer, comprising the steps of:
    Providing a generally planar and generally transparent screen,
    Injecting light into an edge of the screen at predominately around 405 nanometer wavelengths, wherein the lecturer presents visual information by writing on the screen with a fluorescent marker,
    Providing a visible wavelength camera to image the lecturer and the writing through the screen, wherein the lecturer is seen to be facing a viewer through the screen,
    Filtering at least about 85% of light in the range of 410 nanometers to 460 nanometers from the image, and
    Reversing the left-right orientation of the lecturer and writing on the screen, wherein an image of the lecturer and writing made by the lecturer on the screen is reversed in the imaging of the lecturer and writing through the display screen and the writing thereby readable.

* * * * *